United States Patent [19]
Weiler

[11] Patent Number: 5,564,611
[45] Date of Patent: Oct. 15, 1996

[54] SWING-AWAY WHEEL CARRIER

[76] Inventor: Raywood C. Weiler, 14149 Calle Contesa, Victorville, Calif. 92392

[21] Appl. No.: 409,702

[22] Filed: Mar. 23, 1995

[51] Int. Cl.$^6$ .................................................. B62D 43/02
[52] U.S. Cl. .......................... 224/502; 224/518; 224/558
[58] Field of Search ..................................... 224/502, 509, 224/518, 519, 42.21, 42.24, 555, 558

[56] References Cited

U.S. PATENT DOCUMENTS

| | | | |
|---|---|---|---|
| 3,343,736 | 9/1967 | Sellers | 224/42.21 X |
| 3,598,296 | 8/1971 | Gostomski | 224/42.24 X |
| 3,822,814 | 7/1974 | Baldi | 224/502 |
| 4,042,157 | 8/1977 | Weiler | 224/42.21 |
| 4,561,575 | 12/1985 | Jones | 224/42.21 |
| 4,679,717 | 7/1987 | Hansen | 224/509 |
| 4,817,834 | 4/1989 | Weiler | 224/509 |

*Primary Examiner*—Renee S. Luebke
*Attorney, Agent, or Firm*—Marshall, O'Toole, Gerstein, Murray & Borun

[57] ABSTRACT

The invention is directed to a wheel carrier which is adapted to be mounted exclusively to a cross tube of a receiver bracket assembly, which is typically attached to the underside of a motor vehicle and which is used to facilitate attachment of a trailer hitch in the form of a ball mount assembly. The simple manner in which the wheel carrier attaches to the receiver bracket assembly greatly decreases the necessary mounting time and avoids the necessity of drilling holes in the body and/or bumper. The wheel carrier has a carrier member, a wheel support member connected to the carrier member and adapted to support a motor vehicle wheel, and a mounting mechanism for mounting the carrier member exclusively to the cross tube of the receiver bracket assembly. The cross tube typically has a cross-sectional shape which is substantially square. The mounting mechanism may include a first mounting bracket, a second mounting bracket, and fasteners for securing the first and second mounting brackets together about the cross tube at a mounting area. The first and second mounting brackets are shaped such that, when secured together, they define an aperture having a substantially square cross-sectional shape that substantially conforms to a substantially square cross-sectional shape of the mounting area of the cross tube.

22 Claims, 3 Drawing Sheets

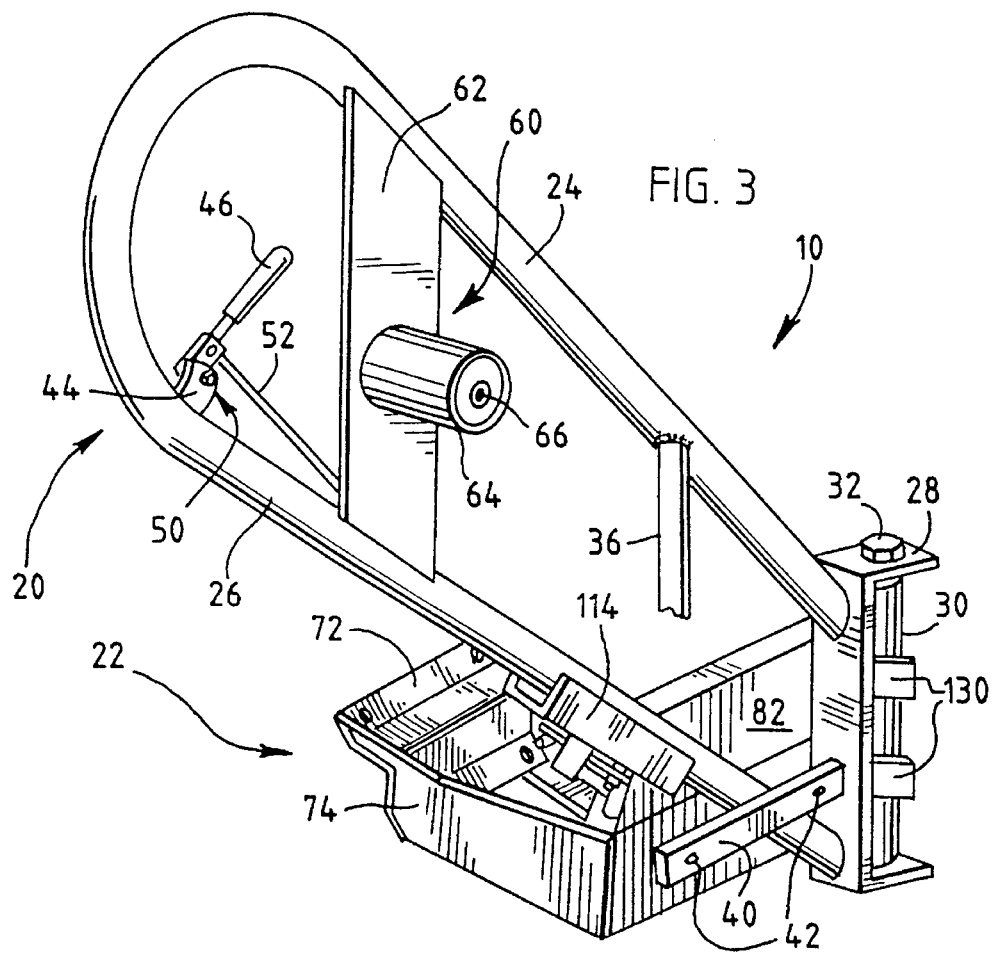
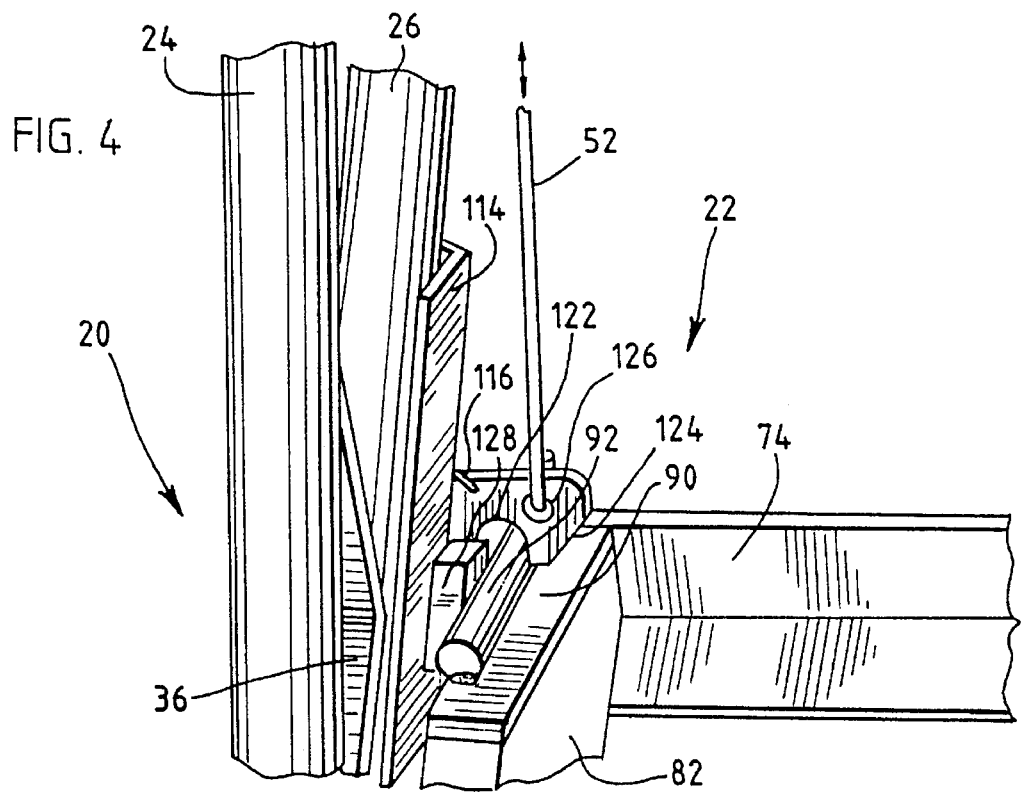

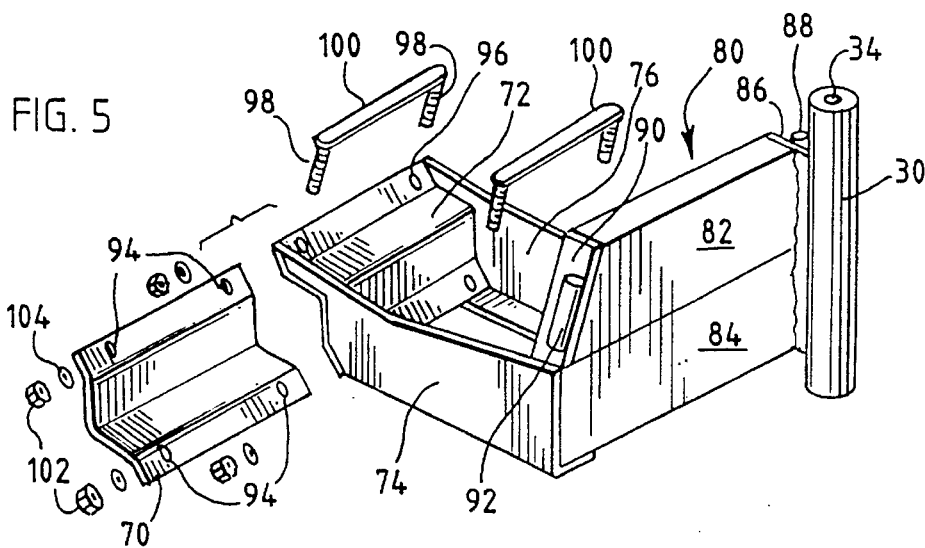
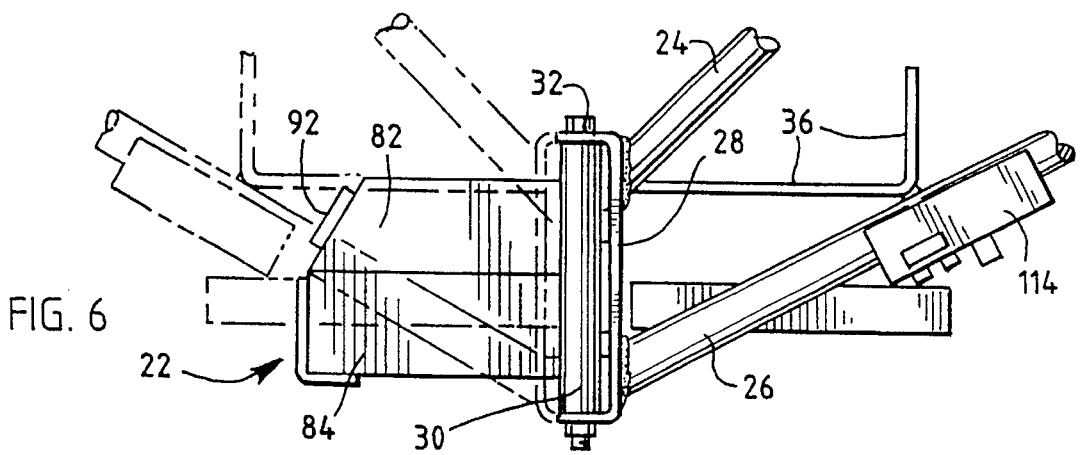
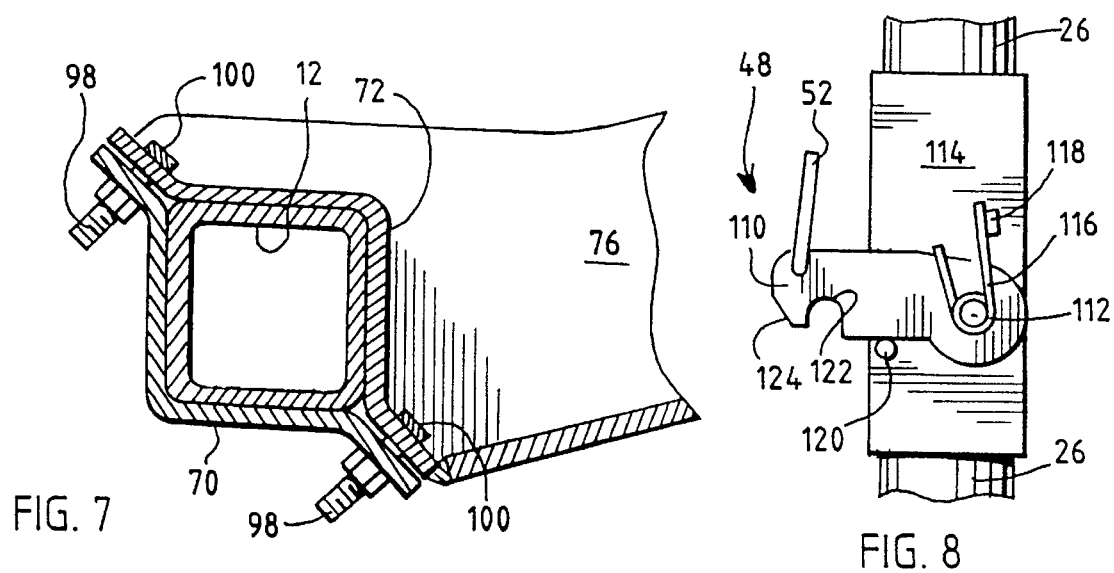

SWING-AWAY WHEEL CARRIER

BACKGROUND OF THE INVENTION

The present invention is directed to a wheel carrier of the type adapted to be mounted on a motor vehicle for carrying a spare wheel for the motor vehicle.

Spare wheel carriers have been used to carry a spare wheel for a motor vehicle, such as a passenger car, truck, or van. Such spare wheel carriers are typically mounted on the rear of the vehicle. One such spare wheel carrier is disclosed in U.S. Pat. No. 4,042,157 to Raywood C. Weiler. That wheel carrier is adapted to be mounted to the door of a motor vehicle, such as the rear door of a van, via a mounting mechanism so that the spare wheel pivots with the door.

Another wheel carrier is disclosed in U.S. Pat. No. 4,817,834 to Raywood C. Weiler. That wheel carrier has a first mounting bracket that is attached to the bumper of the vehicle and a second mounting bracket that is attached to a rear door of the vehicle. The first mounting bracket is connected to a carrier arm which supports the spare wheel. The carrier arm is pivotable between a first position in which the spare wheel is disposed adjacent the rear door of the vehicle and a second position in which the spare wheel is disposed away from the rear door.

Other spare wheel carriers having different designs have been utilized. One problem with conventional spare wheel carriers is that the process for mounting them on a motor vehicle is unduly complicated. For example, mounting a spare wheel carrier on a motor vehicle may require attachment of the carrier to the motor vehicle at several points, which may require a relatively long time and a relatively large number of mounting tools. One spare wheel carrier currently marketed by Chrysler Corporation comes with approximately 20 pages of mounting instructions and is believed to require between seven and nine hours for mounting it to the vehicle. Another problem with conventional spare wheel carriers is that the process for mounting them requires permanent alteration of a motor vehicle as by drilling holes in the bumper and/or body.

SUMMARY OF THE INVENTION

The invention is directed to a wheel carrier which is adapted to be mounted exclusively to a cross tube of a receiver bracket assembly, which is typically attached to the underside of a motor vehicle and which is used to facilitate attachment of a trailer hitch in the form of a ball mount assembly. The simple manner in which the wheel carrier attaches to the receiver bracket assembly greatly decreases the necessary mounting time and avoids the necessity of drilling holes in the body and/or bumper.

The wheel carrier has a carrier member, a wheel support member connected to the carrier member and adapted to support a motor vehicle wheel, and mounting means for mounting the carrier member exclusively to the cross tube of the receiver bracket assembly. The cross tube typically has a cross-sectional shape which is substantially square. The mounting means may include a first mounting bracket, a second mounting bracket, and means for securing the first and second mounting brackets together about the cross tube at a mounting area. The first and second mounting brackets are shaped such that, when secured together, they define an aperture having a substantially square cross-sectional shape that substantially conforms to the substantially square cross-sectional shape of the mounting area of the cross tube.

The mounting means may have a pair of support arms, each of which has a pair of substantially planar portions disposed at right angles to each other. Providing the mounting means with a pair of generally L-shaped support arms increases the structural integrity of the mounting means, thus allowing it to adequately support the weight of the carrier member with a spare wheel attached.

The wheel carrier has means for pivotally connecting the carrier member to the mounting means, with the carrier member being pivotable through a range of positions between a first position in which the carrier member is adjacent the motor vehicle and a second position in which the carrier member is disposed away from the motor vehicle. The wheel carrier may also include means connected to the mounting means for preventing the carrier member from pivoting past the first position so that the carrier member is prevented from coming into contact with the motor vehicle. The wheel carrier may also have a latching member for releasably latching the carrier member in the first position.

Instead of being attachable to the cross tube of a receiver bracket assembly, the wheel carrier could be attached exclusively to another structure on the vehicle at a single mounting area.

These and other features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 3 is a perspective view of wheel carrier;

FIG. 4 is a perspective view of a portion of the wheel carrier;

FIG. 5 is a perspective view of the mounting mechanism of the wheel carrier;

FIG. 6 is a elevational view of a portion of the wheel carrier;

FIG. 7 is a side view of the mounting mechanism taken along lines 7—7 of FIG. 2; and FIG. 8 illustrates the latching mechanism of the wheel carrier.

DETAILED DESCRIPTION OF A PREFERRED EMBODIMENT

Figure 1:
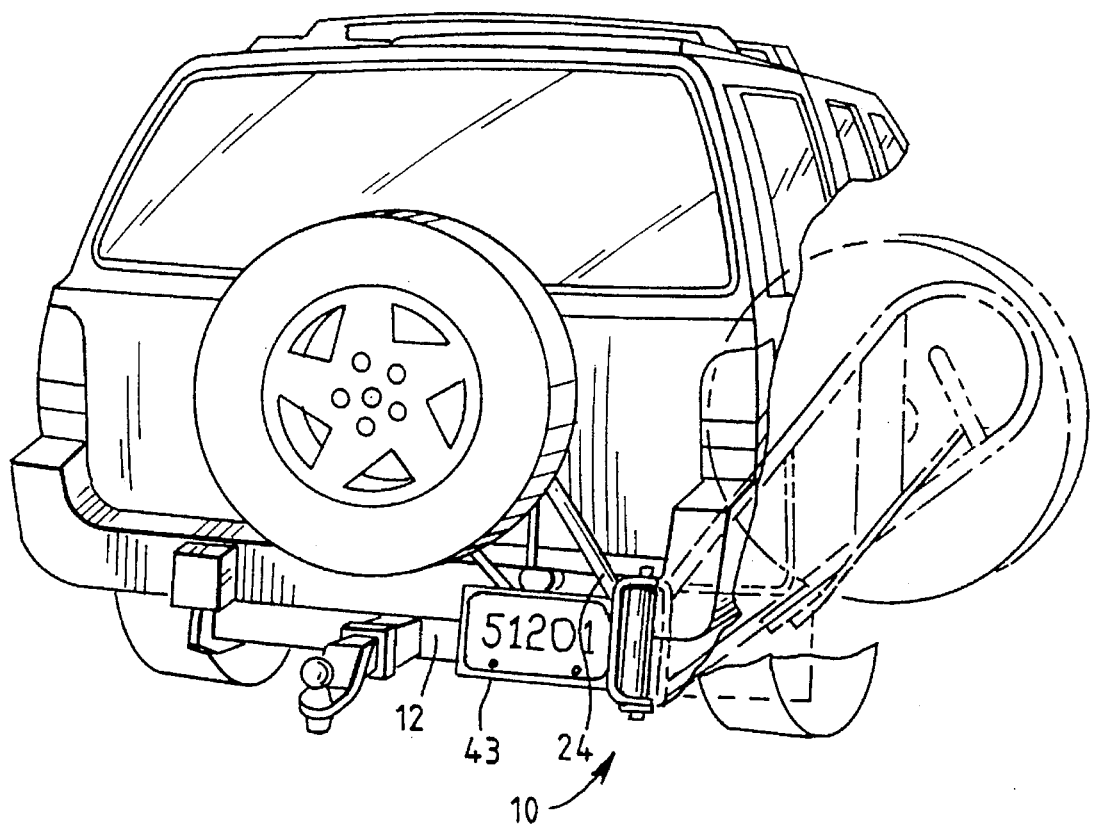
FIG. 1 illustrates a preferred embodiment of a wheel carrier in accordance with the invention shown attached to the rear of a motor vehicle.
Figure 2:
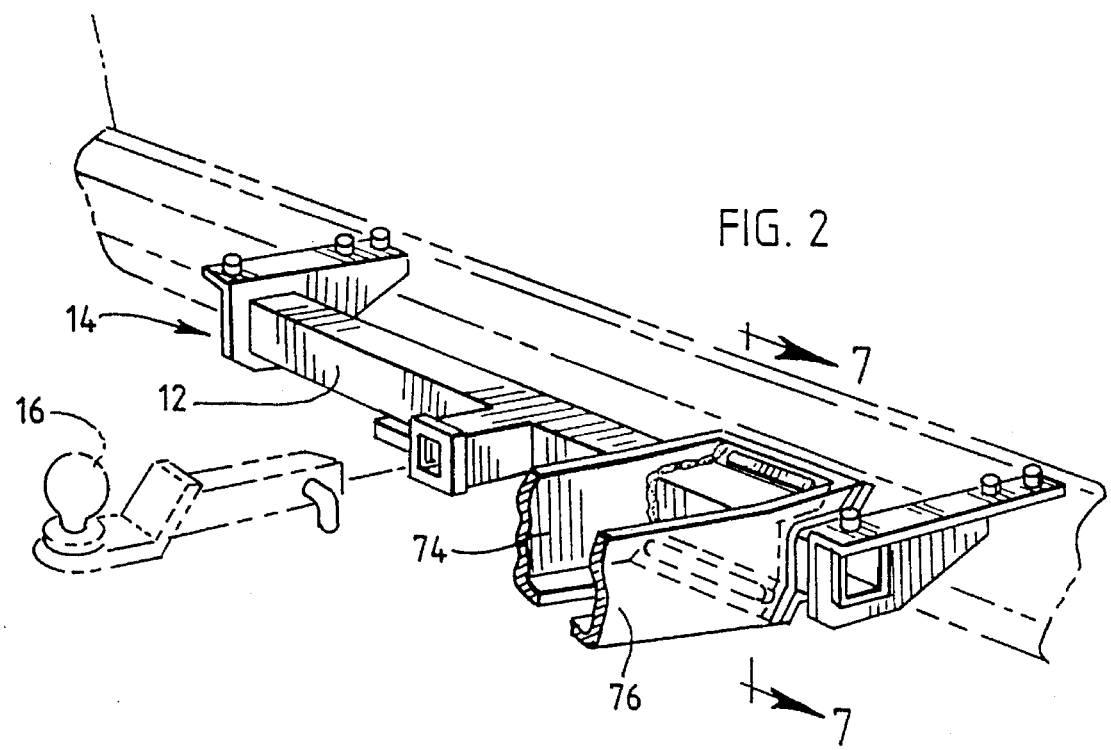
FIG. 2 is a perspective view of a mounting mechanism of the wheel carrier shown mounted to a receiver bracket assembly connected to the underside of the motor vehicle.

A preferred embodiment of a wheel carrier 10 in accordance with the invention is illustrated in the figures. As illustrated in FIGS. 1 and 2, the wheel carrier 10 is adapted to be attached to the cross tube 12 of a conventional receiver bracket assembly 14 which is typically bolted or otherwise connected to the frame of the motor vehicle underneath its body and which is typically used to facilitate attachment of a ball mount assembly 16 for towing a trailer.

Referring to FIG. 3, the wheel carrier 10 includes a carrier member 20 pivotally connected to a mounting mechanism 22. The carrier member 20 has an upper hollow cylindrical carrier arm 24 and a lower hollow cylindrical carrier arm 26 integrally formed with the upper arm 24. The carrier arms 24, 26, which are disposed at an angle to each other, are welded to a C-clamp 28.

The interior portion of the C-clamp 28 receives a vertically disposed pivot tube 30 which is welded to the mounting mechanism 22 (see FIG. 5). The C-clamp 28 is pivotally secured to the pivot tube 30 via a long bolt 32 which passes through a pair of holes (not shown) in the upper and lower portions of the C-clamp 28 and through a central bore 34 (FIG. 5) in the pivot tube 30.

The carrier member 20 has a right-angle support member 36 welded to the carrier arms 24, 26 to provide enhanced structural integrity to the carrier member 20, and a license-plate mounting bar 40 is also welded to the carrier arm 26. The mounting bar 40 has a pair of holes 42 formed therein to facilitate attachment of a rectangular plate 43 (FIG. 1) of about the same size as a license plate. The rectangular plate 43 has four holes (not shown) therein to facilitate attachment of the license plate, and a small plate (not shown) may be mounted to the top of the rectangular plate 43 to facilitate attachment of a small light thereto for illumination of the license plate.

Referring back to FIG. 3, the carrier member 20 has a metal stub 44 welded thereto to which a lever arm 46 for a latching mechanism 48 (FIG. 8) is pivotally attached at a pivot point 50. As described below, the lever arm 46 actuates the latching mechanism 48 via an actuator rod 52 attached to the lever arm 46.

A wheel support member 60 in the form of a flat plate 62 and a cylindrical member 64 is fixed to the carrier member 20. The flat plate 62 is welded to both the carrier arms 24, 26, and the cylindrical member 64 is welded to the plate 62. The cylindrical member 64 has a central threaded bore 66 to facilitate the attachment of a conventional retention mechanism (not shown) for retaining a spare wheel on the cylindrical member 64.

Such a conventional retention mechanism may be provided in the form of a rectangular retention plate having a central hole and being fixed to a hollow retaining cylinder having an inside diameter which is slightly larger than the outside diameter of the cylinder 64 so that the retaining cylinder of the retention mechanism may slide over the cylinder 64. The retention mechanism may then be secured to the cylinder 64 by a bolt which passes through the central hole in the retention plate and through the threaded bore 66 in the cylinder 64. The size of the retention plate is large enough to prevent the spare wheel from coming off the wheel support member 60.

Referring to FIG. 5, the mounting mechanism 22 has a first mounting bracket 70, a second mounting bracket 72, and a pair of support arms 74, 76 welded to the second mounting bracket 72. Each of the support arms 74, 76 has a pair of substantially planar portions disposed at right angles to each other (i.e. L-shaped, with one portion being disposed vertically and the other portion being disposed horizontally as shown better in FIG. 2) to provide increased structural integrity.

The support arms 74, 76 are welded to a face plate 80 composed of a pair of adjacent, hollow rectangular steel members 82, 84. The vertically disposed portion of the support arm 76 disposed adjacent the rear surface of the face plate 80 has a vertical width large enough to allow it to be welded to the rear surfaces of both the steel members 82, 84. The steel members 82, 84 are also fixed together by their both being welded to a vertically disposed side plate 86. The pivot tube 30 is welded to the side plate 86, as well as a solid steel cylinder 88 which, as described below, limits the pivoting of the carrier member 20.

The upper left-hand portion of the steel member 82 is angled, and a steel plate 90 is welded thereto. A solid steel cylinder 92 is welded on top of the steel plate 90. As described below, the steel cylinder 92 cooperates with the latching mechanism 48 (FIG. 8) to retain the carrier member 20 of the wheel carrier 10 in place.

Referring to FIG. 5, the first mounting bracket 70 has four holes 94 formed therein, and the second mounting bracket 72 has four corresponding holes 96 formed therein to accommodate a pair of bolt assemblies each consisting of a pair of bolts 98 welded to a cross-bar 100. The cross-bar 100 maintains the relative position of the pairs of bolts 98 to further simplify mounting of the wheel carrier 10. Four nuts 102 and four washers 104 may be used to secure the bolt assemblies in place.

As shown in FIG. 7, the cross-sectional shapes of the mounting brackets 70, 72 are adapted to conform to the square cross-sectional area of the cross tube 12 to which the mounting brackets 70, 72 are secured. Instead of having a square cross-sectional area, the cross tube 12 and mounting brackets 70, 72 may be provided with other non-rotationally symmetric cross-sectional shapes.

The provision of the particular mounting brackets 70, 72, as well as the two arms 74, 76, each of which is generally L-shaped, causes the mounting mechanism 20 to have sufficient structural integrity so that the wheel carrier 10 may be adequately supported exclusively by the attachment of the mounting mechanism 20 to a single mounting area on the cross tube 12 of the receiver bracket assembly 14. Alternatively, depending on the design of the motor vehicle, the wheel carrier 10 may be mounted to a single mounting area of another portion of the vehicle.

The latching mechanism 48 is illustrated in FIG. 8, which is releasable and includes a latch 110 which is pivotable about a threaded bolt 112 fixed to a U-shaped bracket 114 welded to the lower carrier arm 26. The latch 110 is spring-biased downwards by a spring 116 that is disposed about the bolt 112. One end of the spring 116 is retained in place by a metal stub 118 welded to the bracket 114, and the other end of the spring 116 abuts the upper surface of the latch 110 and urges the latch 110 downwards. A nut (not shown) is threaded onto the bolt 112 to retain the spring 116 in place on the bolt 112. The downward movement of the latch 110 is limited by a physical stop in the form of a cylindrical stub 120 welded to the bracket 114.

An inverted U-shaped slot 122 is formed in the left-hand end of the latch 110 as shown in FIG. 8. The diameter of the slot 122 is just large enough to accommodate the steel cylinder 92 (FIG. 4) attached to the steel plate 90. The end of the latch 110 has an angled portion 124, and the lower end of the actuator rod 52 passes through and is retained in a hole 126 (FIG. 4) in the left-hand end of the latch 110.

Referring to FIG. 4, a rubber block 128 is fixed to the rear side of the U-shaped bracket 114 to prevent excessive noise due to contact between the carrier member 20 and the mounting mechanism 22. Referring to FIG. 3, a pair of travel stops in the form of angled metal stubs 130 are welded to the C-clamp 28. When the carrier member 20 is pivoted in a counterclockwise direction (as viewed from above), the stubs 130 eventually come into contact with the steel cylinder 88 (FIG. 5) welded to the plate 86 to prevent further pivoting of the carrier member 20 so that the carrier member 20 may not make contact with the motor vehicle.

In operation, the carrier member 20 is pivotable through a range of positions defined by a first position in which the carrier member 20 is closely adjacent the rear of the vehicle (shown by the solid lines in FIG. 1) and a second position in which the carrier member 20 is pivoted away from the vehicle (shown by the dotted lines in FIG. 1). The carrier member 20 cannot be pivoted past the first position since the steel member 82, the steel plate 90, and the steel cylinder 92 of the mounting mechanism 22 (see FIG. 4) prevent the rubber block 128 and the bracket 114 from being pivoted any further. When the carrier member 20 is in the second position, the ends of the stubs 130 (FIG. 3) are in contact with the steel cylinder 88 (FIG. 5) to prevent the carrier member 20 from being pivoted past the second position.

While not specifically discernable from the drawings, the carrier member 20 is pivotable about the axis of the pivot tube 30 which, when mounted, is preferably inclined by approximately 10° upwardly and inwardly toward the rear of the vehicle as shown by the solid lines in FIG. 1. This, in turn, causes the spare wheel carried by the carrier member 20 to be supported in an upwardly and inwardly inclined plane generally conforming to the normally sloped rear surface of the vehicle, and tends to maintain the carrier member 20 in the first, or closed, position. As the carrier member 20 is pivoted toward the second, or open, position shown by the dotted lines in FIG. 1, it passes "over center" when it is generally transverse to the rear of the vehicle and proceeds to the fully open position where it stays until a force is applied to again return it over center to the first, or closed, position.

As will be appreciated by those skilled in the art, the weight of the spare wheel and the carrier member 20 is such as to cause the carrier member 20 and the spare wheel to tend to stay in either the first, or closed, position or the second, or open, position once they are placed in either of those positions until it is desired to reverse the position of the carrier member 20 and the spare wheel by intentionally applying an over center pivoting force.

To latch the carrier member 20 in the first position, the carrier member 20 is simply pivoted in a clockwise direction (as viewed from above). As the carrier member 20 moves towards the first position, the angled end portion 124 of the latch 110 (see FIGS. 4 and 8) will come into contact with the steel cylinder 92, forcing the latch 110 upwards despite the downward force exerted by the spring 116. When the cylinder 92 is aligned with the U-shaped slot 122, the spring 116 will force the latch 110 downwards so that the cylinder 92 of the mounting mechanism 22 is retained within the slot 122 by the downward force generated on the latch 110 by the spring 116, thus retaining the carrier member 20 in its first position.

To release the carrier member 20 from its first position, the lever arm 46 (FIG. 3) is forced upwards with sufficient force to overcome the downward force generated by the spring 116 on the latch 110. Consequently, the actuator rod 52 pulls the latch 110 upwards, and with the latch 110 in that position, the carrier member 20 may be freely pivoted away from the first position.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A wheel carrier adapted to be mounted exclusively to a cross tube of a receiver bracket assembly for a motor vehicle, said cross tube having a cross-sectional shape which is substantially square at a mounting area on said cross tube, said wheel carrier comprising:

a carrier member;

a wheel support member connected to said carrier member and adapted to support a motor vehicle wheel;

mounting means, connected to said carrier member, for mounting said carrier member exclusively to said cross tube, said mounting means comprising:
   a first mounting bracket;
   a second mounting bracket; and
   means for securing said first and second mounting brackets together,
   said first and second mounting brackets being shaped such that, when secured together, said first and second mounting brackets define an aperture having a substantially square cross-sectional shape that substantially conforms to said substantially square cross-sectional shape of said mounting area of said cross tube; and means for pivotally connecting said carrier member to said mounting means, said carrier member being pivotable about an upwardly and inwardly inclined axis through a range of positions between a first position in which said carrier member is adjacent said motor vehicle and a second position in which said carrier member is disposed away from said motor vehicle, said carrier member passing through an over center position intermediate said first position and said second position.

2. A wheel carrier as defined in claim 1 wherein said mounting means additionally comprises:

a first support arm having a first substantially planar portion and a second substantially planar portion disposed substantially at a right angle to said first substantially planar portion; and a second support arm having a third substantially planar portion and a fourth substantially planar portion disposed substantially at a right angle to said third substantially planar portion.

3. A wheel carrier as defined in claim 1 additionally comprising means connected to said mounting means for preventing said carrier member from pivoting past said first position so that said carrier member is prevented from coming into contact with said motor vehicle.

4. A wheel carrier as defined in claim 1 additionally comprising a latching member for releasably latching said carrier member in said first position.

5. A wheel carrier as defined in claim 1 additionally comprising means, attached to said carrier member, for supporting a license plate.

6. A wheel carrier as defined in claim 1 wherein said carrier member comprises a pair of integrally formed cylindrical support arms disposed at an angle with respect to each other.

7. A wheel carrier as defined in claim 6 wherein said wheel support member comprises a flat plate fixed to said cylindrical support arms and a cylindrical member fixed to said flat plate.

8. An apparatus comprising:

a carrier member;

a wheel support member connected to said carrier member and adapted to support a motor vehicle wheel;

a receiver bracket assembly for a motor vehicle, said receiver bracket assembly having a cross tube with a cross-sectional shape which is substantially square at a mounting area on said cross tube;

mounting means, connected to said carrier member, for mounting said carrier member exclusively to said cross tube of said receiver bracket assembly, said mounting means comprising:

a first mounting bracket;

a second mounting bracket; and means for securing said first and second mounting brackets together, said first and second mounting brackets being shaped such that, when secured together, said first and second mounting brackets define an aperture having a substantially square cross-sectional shape that substantially conforms to said substantially square cross-sectional shape of said mounting area of said cross tube; and means for pivotally connecting said carrier member to said mounting means, said carrier member being pivotable about an upwardly and inwardly inclined axis through a range of positions between a first position in which said carrier member is adjacent said motor vehicle and a second position in which said carrier member is disposed away from said motor vehicle, said carrier member passing through an over center position intermediate said first position and said second position.

9. An apparatus as defined in claim 8 wherein said mounting means additionally comprises:

a first support arm having a first substantially planar portion and a second substantially planar portion disposed substantially at a right angle to said first substantially planar portion; and a second support arm having a third substantially planar portion and a fourth substantially planar portion disposed substantially at a right angle to said third substantially planar portion.

10. An apparatus as defined in claim 8 additionally comprising means connected to said mounting means for preventing said carrier member from pivoting past said first position so that said carrier member is prevented from coming into contact with said motor vehicle.

11. An apparatus as defined in claim 8 additionally comprising a latching member for releasably latching said carrier member in said first position.

12. A wheel carrier adapted to be mounted to a cross tube of a receiver bracket assembly for a motor vehicle, said wheel carrier comprising:

a carrier member;

a wheel support member connected to said carrier member and adapted to support a motor vehicle wheel;

mounting means, connected to said carrier member, for mounting said carrier member to a cross tube of a receiver bracket assembly for a motor vehicle; and means for pivotally connecting said carrier member to said mounting means, said carrier member being pivotable about an upwardly and inwardly inclined axis through a range of positions between a first position in which said carrier member is adjacent said motor vehicle and a second position in which said carrier member is disposed away from said motor vehicle, said carrier member passing through an over center position intermediate said first position and said second position.

13. A wheel carrier as defined in claim 12 wherein said mounting means is adapted to be mounted to a cross tube having a cross-sectional shape which is non-rotationally symmetric at a mounting area on said cross tube.

14. A wheel carrier as defined in claim 13 wherein said mounting means comprises:

a first mounting bracket;

a second mounting bracket; and means for securing said first and second mounting brackets together, said first and second mounting brackets being shaped such that, when secured together, said first and second mounting brackets define an aperture having a cross-sectional shape that substantially conforms to said cross-sectional shape of said mounting area of said cross tube.

15. A wheel carrier as defined in claim 12 wherein said mounting means additionally comprises:

a first support arm having a first substantially planar portion and a second substantially planar portion disposed substantially at a right angle to said first substantially planar portion; and a second support arm having a third substantially planar portion and a fourth substantially planar portion disposed substantially at a right angle to said third substantially planar portion.

16. A wheel carrier as defined in claim 12 additionally comprising means connected to said mounting means for preventing said carrier member from pivoting past said first position so that said carrier member is prevented from coming into contact with said motor vehicle.

17. A wheel carrier as defined in claim 12 additionally comprising a latching member for releasably latching said carrier member in said first position.

18. A wheel carrier as defined in claim 12 additionally comprising means, attached to said carrier member, for supporting a license plate.

19. A wheel carrier adapted to be mounted exclusively to a single mounting area on a motor vehicle, said wheel carrier comprising:

a carrier member;

a wheel support member connected to said carrier member and adapted to support a motor vehicle wheel;

mounting means, connected to said carrier member, for mounting said carrier member exclusively to said single mounting area on said motor vehicle; and means for pivotally connecting said carrier member to said mounting means, said carrier member being pivotable about an upwardly and inwardly inclined axis through a range of positions between a first position in which said carrier member is adjacent said motor vehicle and a second position in which said carrier member is disposed away from said motor vehicles, said carrier member passing through an over center position intermediate said first position and said second position.

20. A wheel carrier as defined in claim 19 additionally comprising means connected to said mounting means for preventing said carrier member from pivoting past said first position so that said carrier member is prevented frown coming into contact with said motor vehicle.

21. A wheel carrier as defined in claim 19 additionally comprising a latching member for releasably latching said carrier member in said first position.

22. A wheel carrier as defined in claim 19 additionally comprising means, attached to said carrier member, for supporting a license plate.

\* \* \* \* \*